(12) United States Patent
Arberg et al.

(10) Patent No.: US 8,125,993 B2
(45) Date of Patent: Feb. 28, 2012

(54) NETWORK ELEMENT HAVING A DHCP LEASE TIMER

(75) Inventors: Peter Arberg, Hojbjerg (DK); Kishore K. Seshadri, Saratoga, CA (US)

(73) Assignee: Ericsson AB, Stockholm (SE)

( * ) Notice: Subject to any disclaimer, the term of this patent is extended or adjusted under 35 U.S.C. 154(b) by 275 days.

(21) Appl. No.: 12/542,653

(22) Filed: Aug. 17, 2009

(65) Prior Publication Data
US 2009/0307338 A1    Dec. 10, 2009

Related U.S. Application Data

(63) Continuation of application No. 10/955,671, filed on Sep. 29, 2004, now Pat. No. 7,577,146.

(60) Provisional application No. 60/516,348, filed on Oct. 31, 2003.

(51) Int. Cl.
*H04L 12/28* (2006.01)
(52) U.S. Cl. .................. 370/392; 370/400; 709/222
(58) Field of Classification Search .................. 370/254, 370/328, 331, 338; 709/220–229, 245
See application file for complete search history.

(56) References Cited

U.S. PATENT DOCUMENTS

| | | | |
|---|---|---|---|
| 6,223,222 B1 | 4/2001 | Fijolek et al. | |
| 6,876,667 B1 * | 4/2005 | Synnestvedt et al. | 370/466 |
| 6,895,443 B2 | 5/2005 | Aiken | |
| 6,952,428 B1 | 10/2005 | Necka et al. | |
| 7,024,484 B2 | 4/2006 | Alexis | |
| 7,054,944 B2 | 5/2006 | Tang et al. | |
| 7,072,337 B1 | 7/2006 | Arutyunov et al. | |
| 7,096,273 B1 * | 8/2006 | Meier | 709/236 |
| 7,139,818 B1 | 11/2006 | Kinnear et al. | |
| 7,254,630 B1 | 8/2007 | Daude et al. | |
| 7,315,541 B1 | 1/2008 | Housel et al. | |
| 7,337,224 B1 | 2/2008 | Van Horne et al. | |
| 2002/0073182 A1 | 6/2002 | Zakurdaev et al. | |
| 2004/0128367 A1 * | 7/2004 | Piercy et al. | 709/220 |

OTHER PUBLICATIONS

Patrick, M. "DHCP Relay Agent Information Option," RFC 3046, Jan. 2001, 14 pp.
Droms, R., "Dynamic Host Configuration Protocol," RFC 2131, Mar. 1997, 45 pp.
Office Action mailed on Jun. 20, 2008 for U.S. Appl. No. 10/956,175.
Office Action Response mailed Oct. 20, 2008 for U.S. Appl. No. 10/956,175.
Office Action mailed on Jan. 7, 2009 for U.S. Appl. No. 10/956,175.
Office Action Response mailed May 7, 2008 for U.S. Appl. No. 10/956,175.
Office Action mailed on Jul. 22, 2009 for U.S. Appl. No. 10/956,175.
Office Action mailed on Nov. 12, 2009 for U.S. Appl. No. 10/956,175, 30 pages.
Office Action mailed on May 5, 2011 for U.S. Appl. No. 10/956,175, 31 pages.
Office Action mailed on Jan. 3, 2011 for U.S. Appl. No. 10/956,175, 30 pages.
Notice of Allowance mailed on Aug. 3, 2011 for U.S. Appl. No. 10/956,175, 5 pages.

* cited by examiner

*Primary Examiner* — Jung Park
(74) *Attorney, Agent, or Firm* — Blakely Sokoloff Taylor & Zafman, LLP

(57) ABSTRACT

A network element modifying the DHCP lease timer is described. According to one embodiment, an exemplary method includes maintaining, at a network element, DHCP lease time for one or more clients and in response to a DHCP renewal request from a client, on behalf of a DHCP server, providing DHCP renewal services to the client based on lease time information associated with the client without invoking the DHCP server.

19 Claims, 12 Drawing Sheets

| Client ID | IP Address | MAC | Lease Time | Circuit Info | DHCP ID | GI Address |
|---|---|---|---|---|---|---|
| ⋮ | ⋮ | ⋮ | ⋮ | ⋮ | ⋮ | ⋮ |

```
context service-1
dhcp relay server 192.168.1.100
dhcp relay option
interface subscribers multibind
     ip-address 10.10.1.1/24
     dhcp proxy
interface management
     ip-address 192.168.1.1/24
subscriber name sub1
     password test
     dhcp max-addrs 1
subscriber name sub2
     password test
     dhcp max-addrs 1
context service-2
. . .

port atm 2/1
     no shutdown
     atm pvc 1:32 profile vbr-nrt encapsulation
bridge1483
     bind subscriber sub1@service-1
atm pvc 1:33 profile vbr-nrt encapsulation bridge1483
     bind subscriber sub2aservice-1
. . .
```

FIG. 8A

```
context local
  interface dhcp
    ip-address 192.168.1.1/24
!
ip route 10.1.1.1/32 context service-1
ip route 10.2.1.1/32 context service-2
!
context service-1
  dhcp relay server 192.168.1.100
  dhcp relay option
  interface subscribers multibind
    ip-address 10.10.1.1/24
    dhcp proxy
  interface management loopback
    ip-address 10.1.1.1/32
    ip source-address dhcp
  subscriber name sub1
    password test
    dhcp max-addrs 1
  subscriber name sub2
    password test
    dhcp max -addrs 1
  . . .
  ip route 192.168.1.0/24 context local
context service-2
  dhcp relay server 192.168.1.100
dhcp relay option
interface subscribers multibind
    ip-address 10.10.2.1/24
    dhcp proxy
interface management loopback
    ip-address 10.2.1.1/32
    ip source -address dhcp
  subscriber name sub1
    password test
    dhcp max-addrs 1
  subscriber name sub2
    password test
    dhcp max-addrs 1
. . .
ip route 192.168.1.0/24 context local
port atm 2/1
  no shutdown
  atm pvc 1:32 profile vbr-nrt encapsulation bridge1483
bind subscriber sub1@service-1
atm pvc 1:33 profile vbr-nrt encapsulation bridge1483
bind subscriber sub20service-1
...
port atm 2/2
  no shutdown
  atm pvc 1:32 profile vbr-nrt encapsulation bridge1483
bind subscriber sub1@service-2
atm pvc 1:33 profile vbr-nrt encapsulation bridge1483
  bind subscriber sub20service-2
...
```

FIG. 8B

NETWORK ELEMENT HAVING A DHCP LEASE TIMER

CROSS-REFERENCE TO RELATED APPLICATIONS

This application is a continuation of U.S. application Ser. No. 10/955,671, filed Sep. 29, 2004 (U.S. Pat. No. 7,577, 146), which itself claims the benefit of U.S. Provisional Application No. 60/516,348, filed Oct. 31, 2003, which are both hereby incorporated by reference.

FIELD OF THE INVENTION

The present invention relates generally to communications. More particularly, this invention relates to a network element handling DHCP lease time on behalf of a DHCP server.

BACKGROUND OF THE INVENTION

In the field of communications, the need for high-speed transmission of data, including video and audio, has continued to increase. Moreover, there has been an increase in the selection of services by which users can connect to a network, such as the Internet. Specifically, Internet Service Providers (ISPs) may allow for connectivity to the Internet through lower-speed connections at different rates, such as 56 kilobits/second, by employing a Plain Old Telephone Service (POTS) line. Other choices for connection, which are at higher speeds, into a network can include Integrated Services Digital Network (ISDN), Digital Subscriber Line (DSL) service, and cable modem service over a Radio Frequency (RF) cable line. Further, other types of content providers may enable a subscriber to receive different types of media, such as a video stream, audio stream, etc.

In a typical DSL network, a network element supports a wide variety of features to facilitate the management, allocation and distribution of IP addresses. Normally, the subscriber profile can be configured locally on the network element or can be retrieved from a RADIUS (remote access dial in user server) remote server (e.g.). A subscriber profile determines how an IP address (and optionally the associated route for the subscriber LAN) would be provided to a certain subscriber.

Typically, a DHCP (dynamic host configuration protocol) server is responsible for allocating and assigning one or more IP addresses to one or more clients. FIG. 1 is a block diagram illustrating a typical network configuration. In this configuration, a network element 101 serves a relay agent with respect to DHCP server 102 for one or more clients 103 and 104. Typically, when client 103 desires to enter the network, client 103 sends a DHCP discovery broadcasts to network element 101. Network element 101 forwards the request to DHCP server 102. DHCP server 102 then returns an offer back to network element 101 which in turn forwards it back to client 103. When DHCP 102 assigns an IP address to client 103, DHCP 102 replies with a DHCP packet (e.g., a DHCPack) to client 103. When network element 101 forwards this DHCP reply to client 103, network element 101 installs an IP-host route and an ARP entry for the IP address assigned to client 103. Client 103 now has a valid IP address and it knows the IP address of the DHCP 102. Further communications between client 103 and DHCP 102, such as DHCP lease renewal and release, will take place between client 103 and DHCP 102 directly without substantially invoking network element 101.

However, since network element 101 may communicate and service thousands of clients. Each client may need to directly communicate with DHCP 102 for, for example, IP address renewal or release. DHCP 102 may also service other network elements, which may provide services for thousands of other clients. As a result, DHCP 102 may experience heavy traffic from all clients via all network elements.

An IP address may be explicitly released by the client or implicitly released through the expiration of the lease time. In either case, sub-released IP addresses should be available for allocation and assignment.

When client 103 releases the IP address back to DHCP 102, network element 101 has no knowledge whether the IP address has been released until network element 101 sees DHCP 102 assigns that IP address to another of network element's 101 clients. Instead, network element 101 keeps listening to the traffic associated with the IP address until network element 101 sees DHCP 102 assigns that IP address to another of network element's 101 clients. Thus, network element 101 may consider that the IP address is still in use even though client 103 has released the IP address (directly back to DHCP 102). In addition to the resources of network element 103 wasted on such listening, this approach may result in an under utilization of IP addresses where DP DHCP 102 is serially resulting the network elements. Specifically, where DHCP 102 is servicing multiple network elements, DHCP 102 cannot allocate and assign a released IP address to a first network element while a second network element is listening for that IP address (that is, since the second network element listening for the released IP address will not see the reallocation and assignment of that IP address to a client of the first network element. The second network element will not know to stop listening and problems arise if two network elements are listening for the same IP address). This restriction typically leads DHCP 102 to be configured to designate different blocks of IP address to different network elements; if a given network element needs additional IP addresses, DHCP 102 cannot give it IP addresses designated to another network element even if they are not being used.

In addition, DHCP 102 typically maintains all lease time information for all clients. As a result, every client's DHCP renewal or release has to be processed by DHCP 102, which significantly increases the overhead traffic of DHCP 102. Furthermore, since network element 101 has no knowledge when the lease time expires, network element 101 has to keep listening for the IP address associated with the expired lease. Since allowing a lease to expire has the same effect as a client explicitly releasing an IP address, listening to an IP address for which the lease has expired has the same disadvantages as those described above with regard to when a client explicitly releases an IP address.

SUMMARY OF THE INVENTION

A network element modifying the DHCP lease timer is described herein. According to one embodiment, an exemplary method includes maintaining, at a network element, DHCP lease time for one or more clients and in response to a DHCP renewal request from a client, on behalf of a DHCP server, providing DHCP renewal services to the client based on lease time information associated with the client without invoking the DHCP server.

BRIEF DESCRIPTION OF THE DRAWINGS

The present invention is illustrated by way of example and not limitation in the figures of the accompanying drawings in which like references indicate similar elements.

FIG. 5 is a block diagram illustrating an exemplary data structure which may be used in one embodiment of the invention.

FIGS. 8A and 8B are diagrams illustrating exemplary codes for configuring a network element according to one embodiment of the invention.

DETAILED DESCRIPTION

Figure 1:
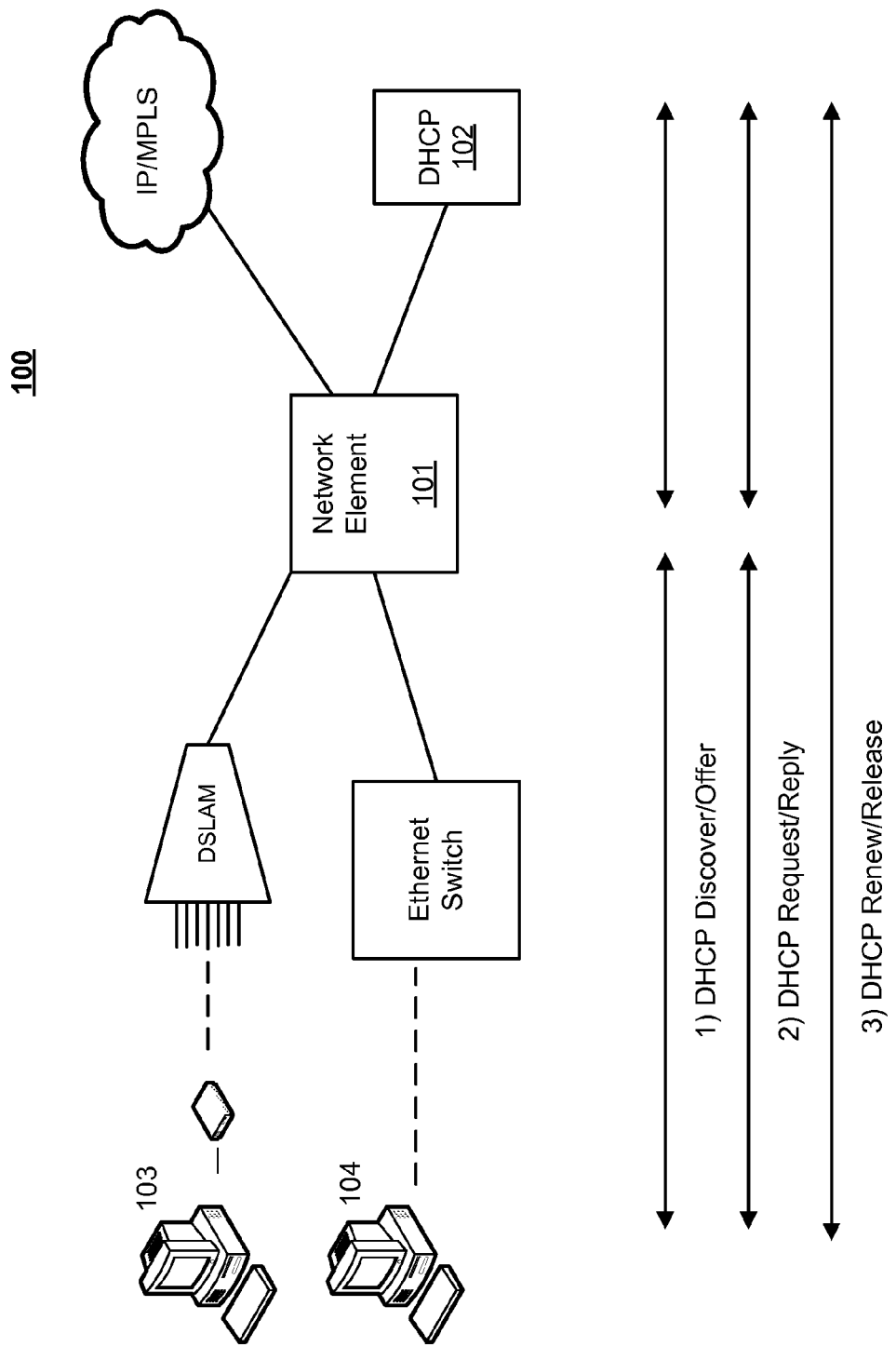
FIG. 1 is a diagram illustrating a typical network infrastructure.

A network element modifying the DHCP lease timer is described herein. In certain embodiments of the invention, a network element that connects clients to a DHCP server acts as a proxy for that DHCP server. In addition, certain of these embodiments allow the network element to: 1) acts as a DHCP proxy for multiple DHCP servers configured to provide redundancy; and/or 2) to facilitate the handling of lease renewals.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent finite sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to one or more different apparatuses for performing the operations herein. This apparatus may be specially constructed for the required purposes (e.g., software, hardware, and/or firmware, etc.), or it may comprise a general purpose computer selectively activated or reconfigured by a computer program stored in the computer. The instructions of such software, firmware, and computer programs may be stored in a machine readable medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, electrical, optical, acoustical or other forms of prorogated signals (e.g., carrier waves, infrared signals, etc.) or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2:
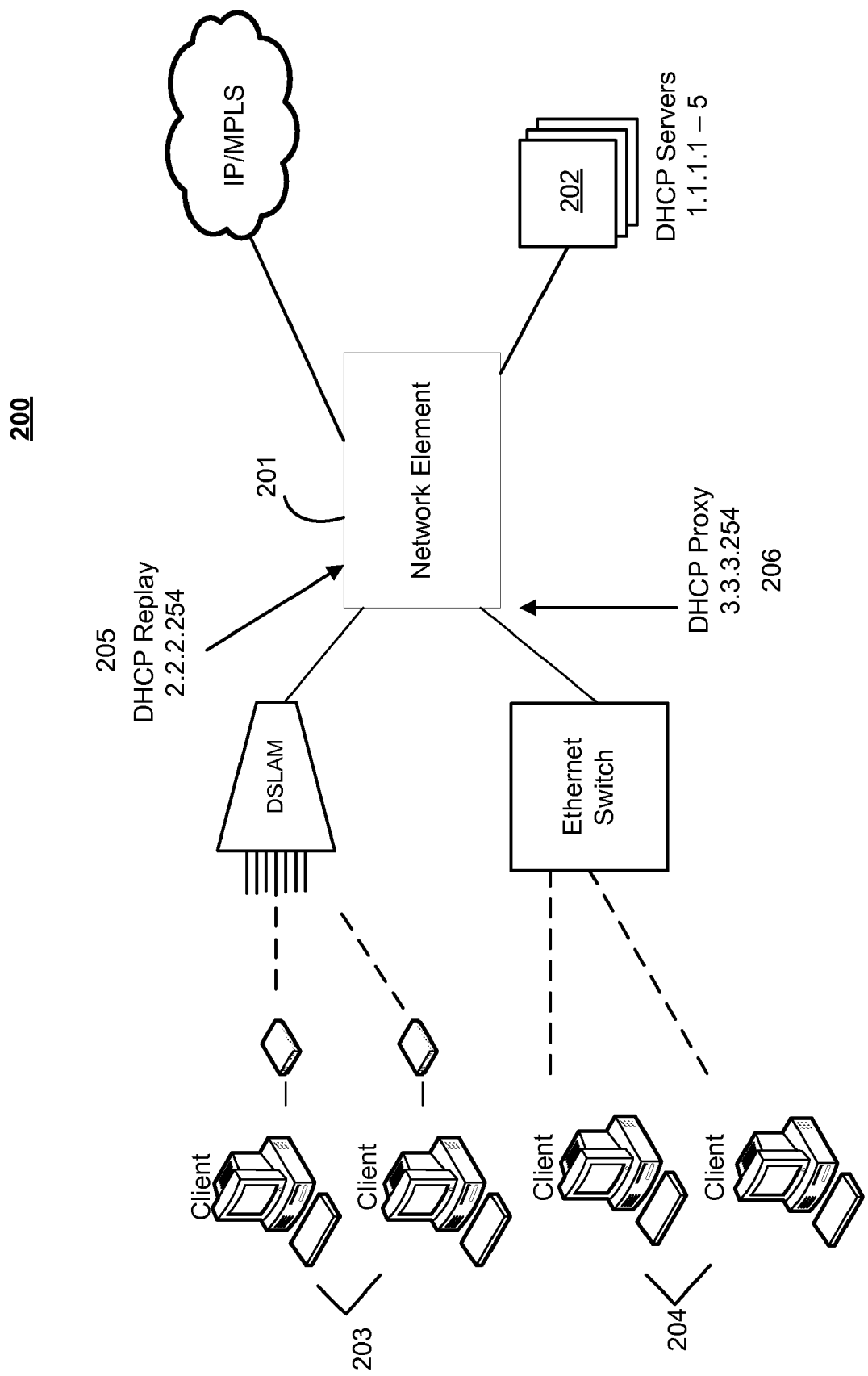
FIG. 2 is a diagram illustrating an exemplary network infrastructure according to one embodiment of the invention.

FIG. 2 is a block diagram illustrating an exemplary network configuration according to one embodiment of the invention. Referring to FIG. 2, according to one embodiment, exemplary network configuration 200 includes a network element 201 to communicate with one or more clients 203 and 204. Network element 201 includes a DHCP relay interface 205 for relaying DHCP requests to one of one or more DHCP servers 202, similar to the one shown in FIG. 1. In addition, network element 201 includes a DHCP proxy interface for serving as a DHCP proxy on behalf of DHCP servers 202. In this embodiment, clients 203 communicate via DHCP relay interface of network element 201 with one of DHCP servers 202. After acquiring IP addresses from DHCP servers 202, clients 203 directly communicate with one of the DHCP servers 202 without involving DHCP relay interface 205 of network element 201. That is, when clients 203 communicate with DHCP 202, clients 203 will specify DHCP 202's IP address as its destination IP address (e.g., 1.1.1.1-1.1.1.5) in a communication packet, instead of DHCP relay interface's IP address (e.g., 2.2.2.254).

However, clients 204 communicate with proxy interface 206 of network element 201, which in turn communicates with DHCP servers 202. In this case, proxy interface 206 serves as a proxy of DHCP 202. That is, proxy interface 206 acts as a DHCP server (e.g., a virtual DHCP server) on behalf of DHCP servers 202. When clients 204 communicate with a DHCP server, clients 204 will specify DHCP proxy interface's IP address (e.g., 3.3.3.254) as its destination IP address instead of DHCP 202's IP address (e.g., 1.1.1.1-1.1.1.5), because clients 204 consider that proxy interface 206 is the intended DHCP server they are communicating with.

Since network element 201 serves as a proxy on behalf of one or more DHCP servers 202 having IP addresses from, for example, 1.1.1.1 to 1.1.1.5, according to one embodiment, network element 201 can maintain multiple DHCP servers and some of which may be used as redundant DHCP servers for backup purposes, which will be described in details further below. In addition, since network element 201 knows which subscriber is assigned with an IP address from which DHCP server, network element 201 may maintain lease time for each subscriber, which will be described in details further below. As a result, when a client releases its IP address back to network element 201 (since the client thinks network element 201 is the DHCP server), network element 201 knows that IP address has been released and network element 201 does not have to keep listening to the traffic of the released IP address. In addition, where DHCP servers 202 service multiple network elements, a released IP address may be reassigned to another subscriber of another network element. Note that DHCP relay interface 205 of network element 201 is not required for network element 201 to operate, particularly to include a DHCP proxy interface.

Figure 3:
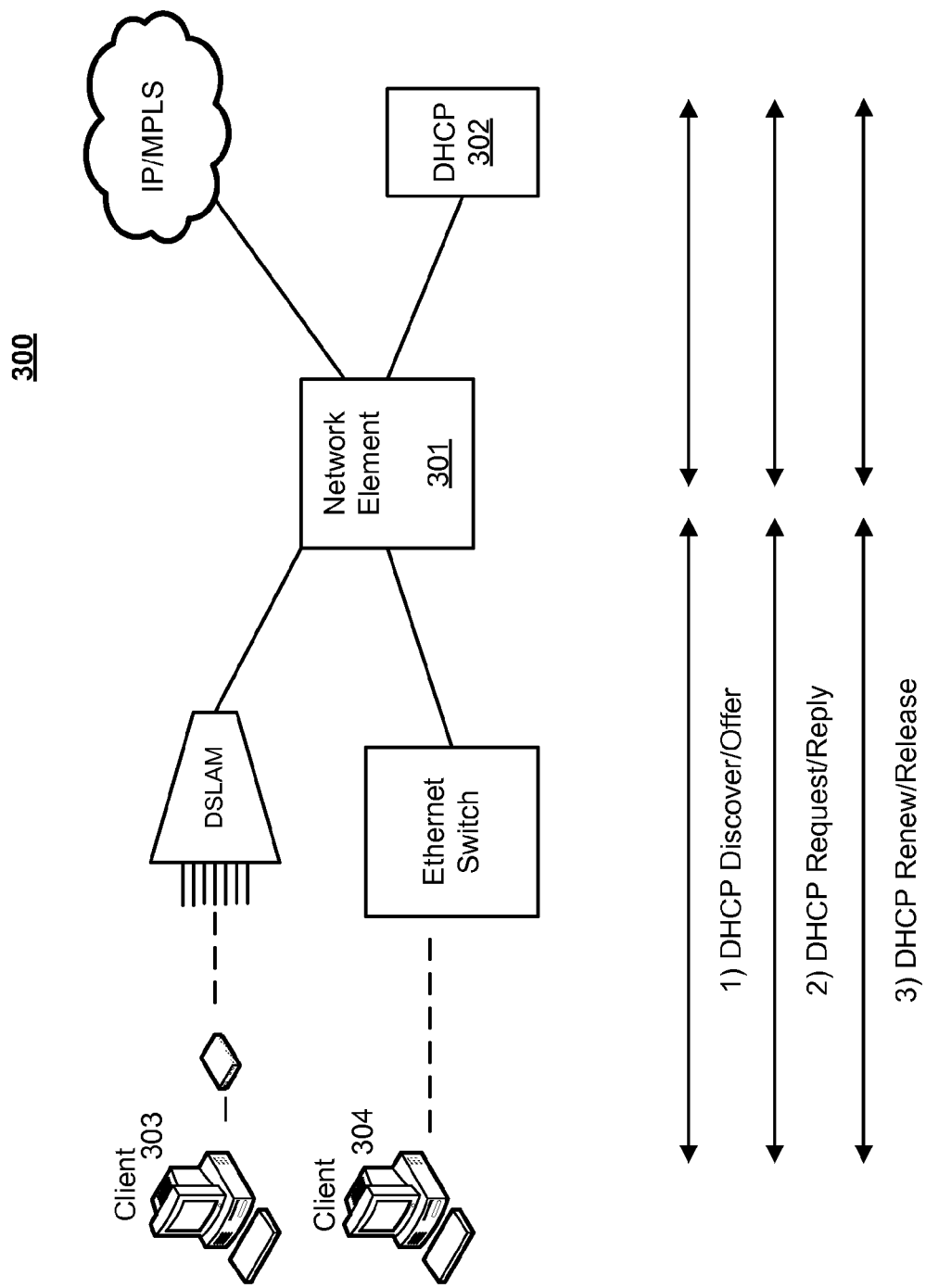
FIG. 3 is a flow diagram illustrating an exemplary process for processing a request for an IP address according to one embodiment of the invention.

FIG. 3 is a diagram illustrating an exemplary network configuration according to one embodiment of the invention. In this embodiment, referring to FIG. 3, exemplary network configuration 300 includes network element 301 having an interface to serve as a DHCP proxy on behalf of DHCP server 302 to provide DHCP services to one or more clients 303 and 304. The interface having DHCP proxy functionality may be implemented as proxy interface 206 of FIG. 2.

According to one embodiment, when client 303 requests for a DHCP service, client 303 sends a DHCP discovery broadcast message to network element 301. Network element 301 forwards the message to DHCP server 302. The DHCP offer and request processes take place via network element 301. When DHCP server 302 assigns an IP address to client 303, DHCP server 302 replies with a DHCP packet, such as a DHCPack, which is received by network element 301. Prior to forwarding this DHCP reply packet to client 303, according to one embodiment, network element 301 changes DHCP IP address in the packet, from DHCP server 302's IP address to network element 301's IP address. In addition, network element 301 installs an IP-host route and an ARP entry for the IP address assigned to client 303. Thereafter, client 303 has a valid IP address and client 303 knows the IP address of network element 301, and considers network element 301 as a DHCP server. Subsequently, client 303 may further communicate with network element 301 as a DHCP server for, for example, the DHCP renewal and/or release.

Note that both the DHCP relay and proxy functionality may work with either a "bind interface" or a "bind subscriber" statement. The "bind interface" can be considered as a non-subscriber mode where AAA (authorization, authentication, and accounting) is not involved, and a "bind subscriber" can be considered as a subscriber mode where AAA is involved for accounting purpose.

Figure 4:
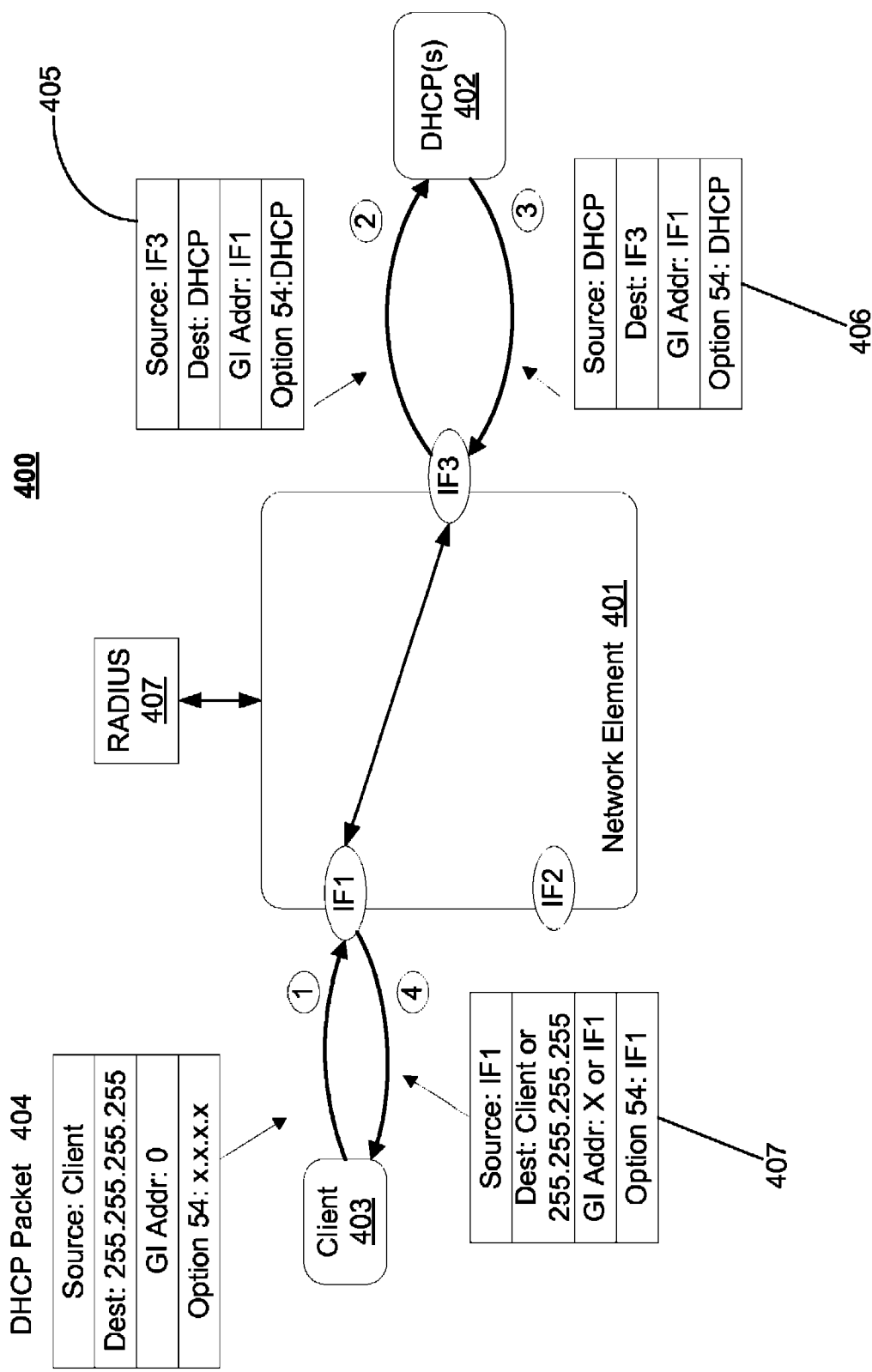
FIG. 4 is a flow diagram illustrating an exemplary process for processing a request for an IP address according to one embodiment of the invention.

FIG. 4 is a block diagram illustrating an exemplary DHCP process according to one embodiment of the invention. Exemplary process 400 may be implemented in exemplary network configuration 300 of FIG. 3. In one embodiment, network element 401 includes a DHCP proxy functionality to enable at least one interface, such as interface IF1, to serve as a DHCP proxy to client 403 on behalf of DHCP 402. Client 403 considers interface IF1 of network element 401 is the DHCP server for the client.

Referring to FIG. 4, when client 403 broadcasts a DHCP broadcast message, client 403 sends a broadcast packet 404 in a network. In one embodiment, packet 404 includes, but not limited to, a source IP address (e.g., the IP address of client 403 or 0.0.0.0) and destination IP address is 255.255.255.255 indicating this message is a broadcast message. Since this is a DHCP broadcast message, the GI address and option 54 fields are irrelevant. When network element 401 receives packet 404, network element 401 may perform optional AAA processes with RADIUS 407, particularly when the DHCP proxy functionality is configured as per subscriber basis. Then network element 401 forwards the packet to an outlet interface IF3 which will forward the packet to the DHCP 402. Before transmitting the packet to IF3, network element 401 may modify the packet (e.g., packet 405). In one embodiment, network element 401 replaces the source IP address of the packet with the outlet interface IF3's IP address and the destination IP address with the DHCP 402's IP address. In addition, network element 401 may set the GI address field as the inlet interface IF1's IP address and the option 54 field as DHCP 402's IP address. Furthermore, (e.g., if client 403 does not specify option 82 field of the packet 404, always, etc.) network element may fill in the circuit information in the option 82 field, such as, for example, the slot number, the port number, and/or the PVC (permanent virtual circuit) ID, etc.

When DHCP 402 receives forwarded broadcast message 405, DHCP 402 returns an offer message 406 back to IF1 via IF3 of network element 401. In one embodiment, DHCP 402 specifies, in return packet 406, its IP address as the source IP address, IF3's IP address as a destination IP address. In addition, DHCP 402 specifies IF1's IP address as a GI address in the packet and its IP address in the option 54 field. Alternatively, the DHCP server 402 may simply leaves the GI address field and the option field 54 unchanged since they are specified in the message 405 by the network element 401. When network element 401 receives packet 406, it modifies the packet (e.g., packet 407). In one embodiment, the modification includes replacing the source IP address with IF1's IP address which indicates that IF1 of network element 401 is the DHCP with respect to client 403. In addition, network element 401 may change the GI address to the IF1's IP address and changes the option 54 field as the IF1's IP address. Furthermore, if network element 401 modified the option 82 field when it received the DHCP broadcast message, network element 401 may strip off the option 82 field when it forwards the offer packet 407 back to client 403.

Thereafter, during the subsequent communications, such as, DHCP request or DHCP release, client 403 may use the IP address of interface IF1 of network element 401 as a destination IP address and IF1's IP address as the DHCP server address in the option 54 field, because client 403 was "told" that interface IF1 of network element 401 is the DHCP server when it received the DHCP offer. FIG. 5 is a block diagram illustrating an exemplary data structure maintained by a network element according to one embodiment of the invention, in order to accomplish the processes described above.

Thus, since network element 401 serves as a DHCP proxy on behalf of DHCP 402, according to one embodiment, multiple DHCP servers may be maintained without the knowledge of client 403. At least one of the multiple DHCP servers may serve as a redundant DHCP server. In addition, according to another embodiment, network element 401 may maintain lease time information for client 403 since network element operates as a DHCP server with respect to client 403. As a result, the subsequent DHCP renewal or release may be partially or fully handled by network element 401 without invoking DHCP 402 which greatly reduce traffic to DHCP 402.

According to one embodiment, a network element having functionality described above may be configured via at least one of the following commands:

| Command | [no] dhcp relay server ip-addr |
|---|---|
| Command Mode | Context configuration |
| Default Behavior | no dhcp relay is configured |

This command enables the DHCP relay and proxy functionality in a context. According to one embodiment, all DHCP requests received on interfaces in this context will be forwarded to the external DHCP sever with specified IP address.

| Command | [no] dhcp relay option |
|---|---|
| Command Mode | Context configuration |
| Default Behavior | no dhcp relay option |

This command will enable the sending of DHCP options in all DHCP packets being relayed from this context of the network element.

| Command | [no] dhcp {relay | proxy} [size <max-num>] |
|---|---|
| Command Mode | Interface configuration |
| Default Behavior | no, relay/proxy is disabled on the interface |

These commands will enable or disable either DHCP relay or proxy on a specific interface. It also sets the maximum number of DHCP IP address available on this interface via the size <max-num> option. The max-num can be configured between 1 and 65,535.

| Command | Ip source-address {dhcp} |
|---|---|
| Command Mode | Interface configuration |
| Default Behavior | no DHCP source-address is configured |

This command works with DHCP packets sourced from a network element. It is important that the IP address is controlled with which the network element is acting as a DHCP server in the proxy configuration. If "ip source-address" is not configured the interface ip-address from where the packet is transmitted is used as source address, but in applications where only one DHCP address is used in a network element, and intercontext routing is enabled, it becomes important that each context is uniquely identified by a single source-address.

| Command | [no] dhcp max-addrs max-num |
|---|---|
| Command Mode | Subscriber configuration |
| Default Behavior | no (max-num = 0), which will say subscriber cannot use DHCP to obtain an IP address |

This command configures a maximum number of IP addresses this subscriber can request via the DHCP protocol. A DHCP max-addrs>0 may be configured in the subscriber profile to allow this subscriber to use the DHCP protocol to get a dynamic IP address. The maximum address size may be configured between 1 and 255, according to one embodiment.

| Command | [no] debug dhcp-relay packet |
|---|---|
| | [no] debug dhcp {all | mac = hh:hh:hh:hh:hh:hh | packet |relay |
| Command Mode | Exec(10) |

These commands may be used for debugging purposes.

| Command | show dhcp relay server |
|---|---|
| Command Mode | Exec(10) |

This command displays information regarding the configured DHCP server.

| Command | show dhcp relay hosts |
|---|---|
| Command Mode | Exec(10) |

This command displays all the IP-hosts learnt by the relay/proxy functionality and the known information such as lease time.

| Command | show dhcp relay shmem |
|---|---|
| Command Mode | Exec(10) |

This command displays all the IP-hosts learnt by the relay/proxy functionality and written to the file/microdrive.

Figure 6:
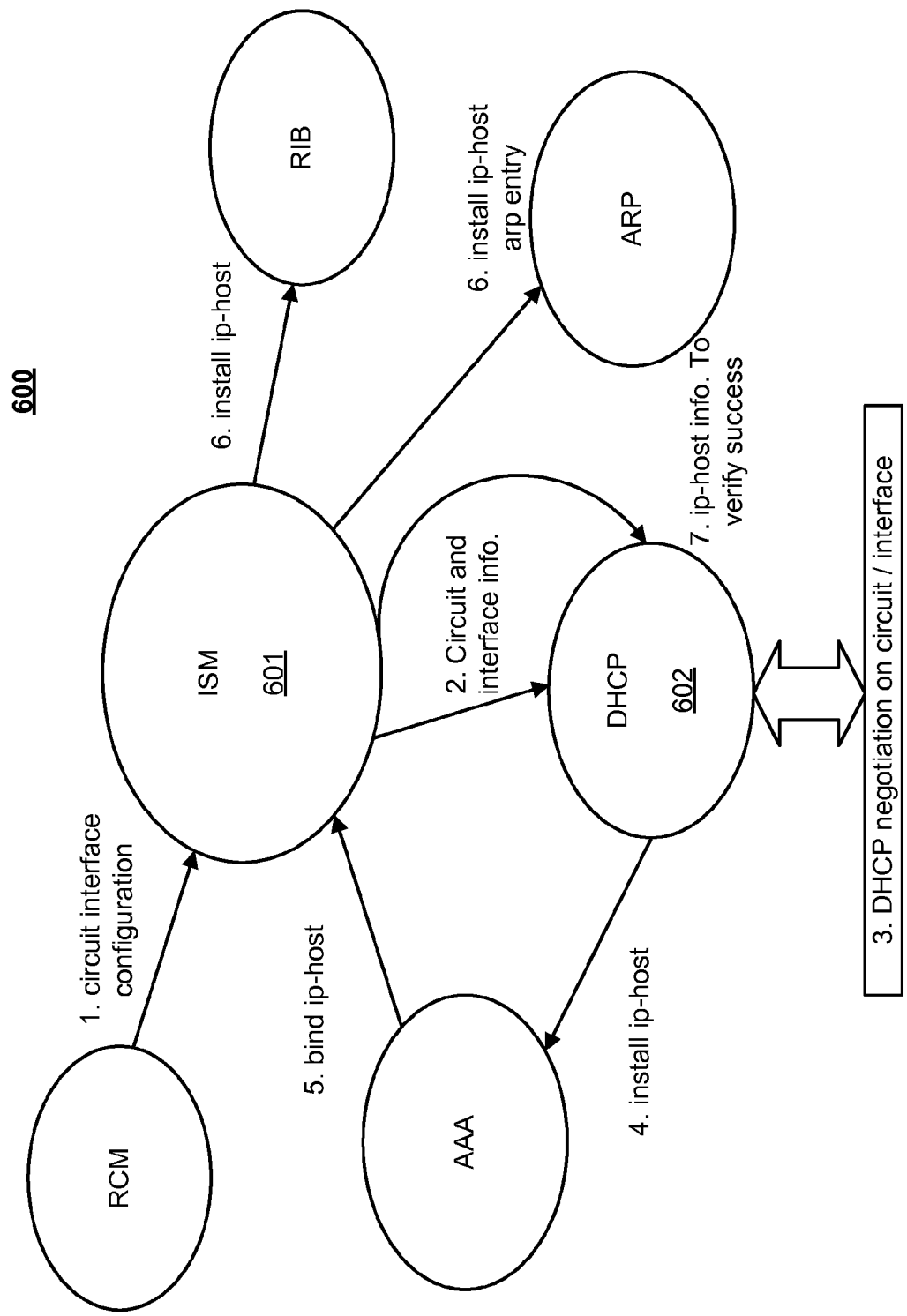
FIG. 6 is a block diagram illustrating an exemplary information flow within a network element according to one embodiment of the invention.

According to one embodiment, the DHCP server states are preserved within a network element, which may be used by the relay and/or proxy functionality of the network element. FIG. 6 is a state diagram illustrating an exemplary information flow within a network element according to one embodiment of the invention. In one embodiment, referring to FIG. 6, an interface state manager (ISM) 601 on the XCRP is running in a "hot" mode between a primary and a secondary XCRP, and ISM 601 is the main responsible for state replication. Meanwhile, DHCP daemon 602 writes DHCP state to the micro-drive for every DHCP IP address entry, such as, for example, IP address, MAC address, create time, lease time, circuit information (e.g., slot, port, VPI, and VCI, etc.), which may be stored in a data structure, such as data structure 500 shown in FIG. 5, also referred to as a DHCP preserve state file.

In one embodiment, DHCP state preservation information may be used in at least one of the following situations:

| Process Restart | DHCP preserve state file on micro-drive is read, but ISM information has higher priority |
|---|---|
| Power Cycle | DHCP preserve state file is read and has priority over ISM information |
| XCRP Switchover | DHCP preserve state is created from the "hot" running ISM module on the secondary XCRP, and from this information is the preserve state file written to the new micro-drive |

According to one embodiment, DHCP demon daemon 602 removes a dynamic DHCP IP address from a circuit in at least one following situations and sends an RADIUS accounting stop record;

| Network Element Event | DHCP Relay | DHCP Proxy |
|---|---|---|
| Circuit delete | Yes | Yes |
| IP address given to another circuit | Yes | Yes |
| DHCP lease time expired | No | Yes |

Figure 7A:
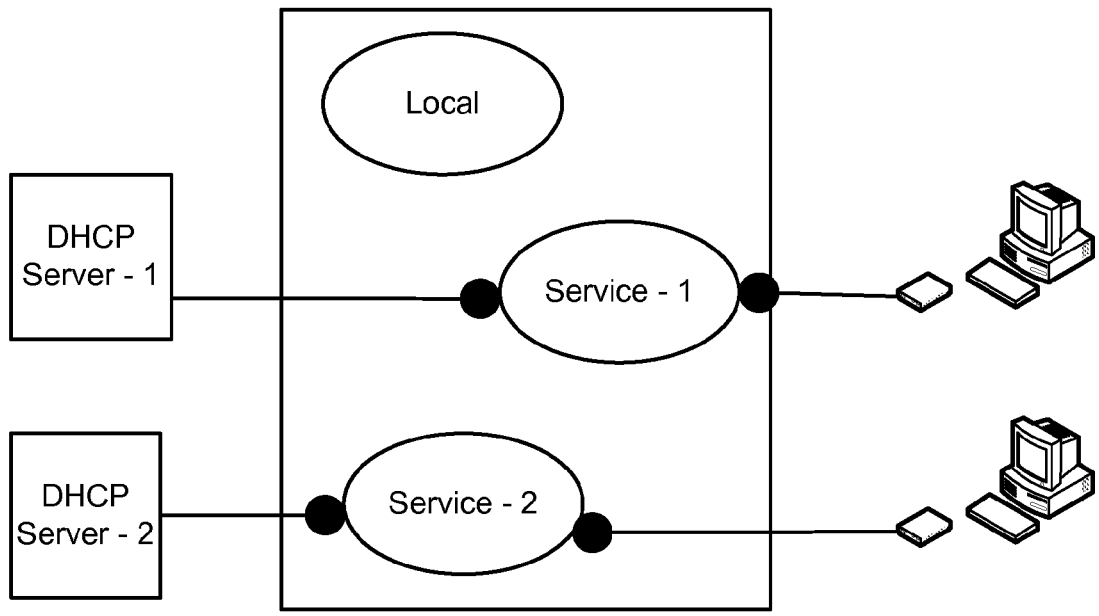
FIGS. 7A and 7B are block diagrams illustrating exemplary configurations of a network element according to one embodiment of the invention.

FIG. 7A is a block diagram illustrating an exemplary network configuration according to one embodiment of the invention. In this embodiment, each context is deployed with individual DHCP servers. An exemplary configuration program associated with the network configuration of FIG. 7A is shown in FIG. 8A.

Figure 7B:
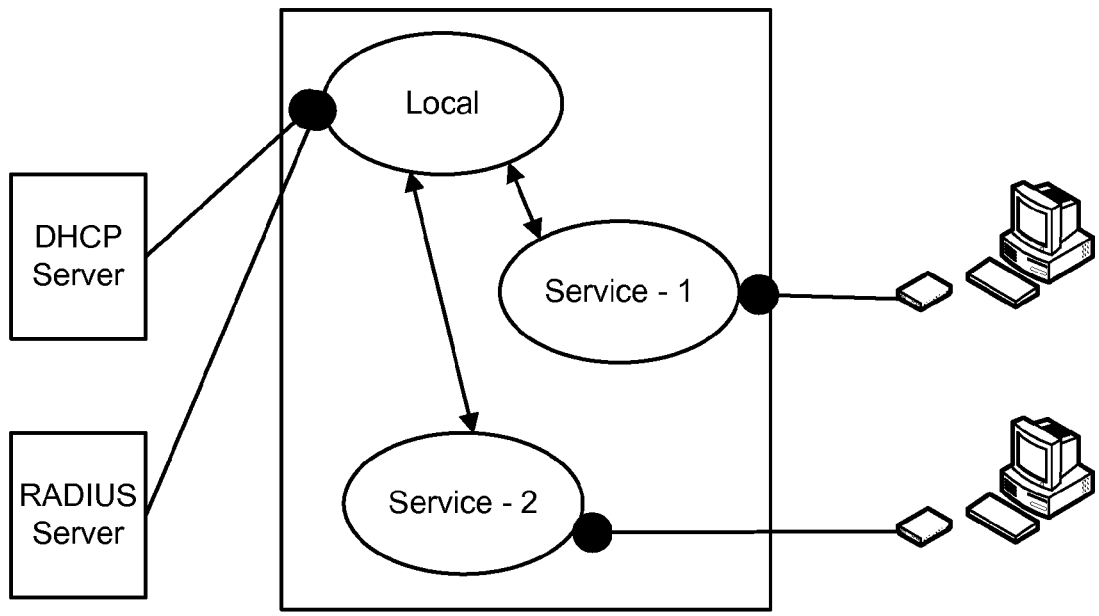

FIG. 7B is a block diagram illustrating an exemplary network configuration according to one embodiment of the invention. In this embodiment, a global DHCP server, which will service multiple contexts and using intercontext routing to reach the global DHCP server from the individual service contexts. An exemplary configuration program associated with the network configuration of FIG. 7B is shown in FIG. 8B.

Figure 9:
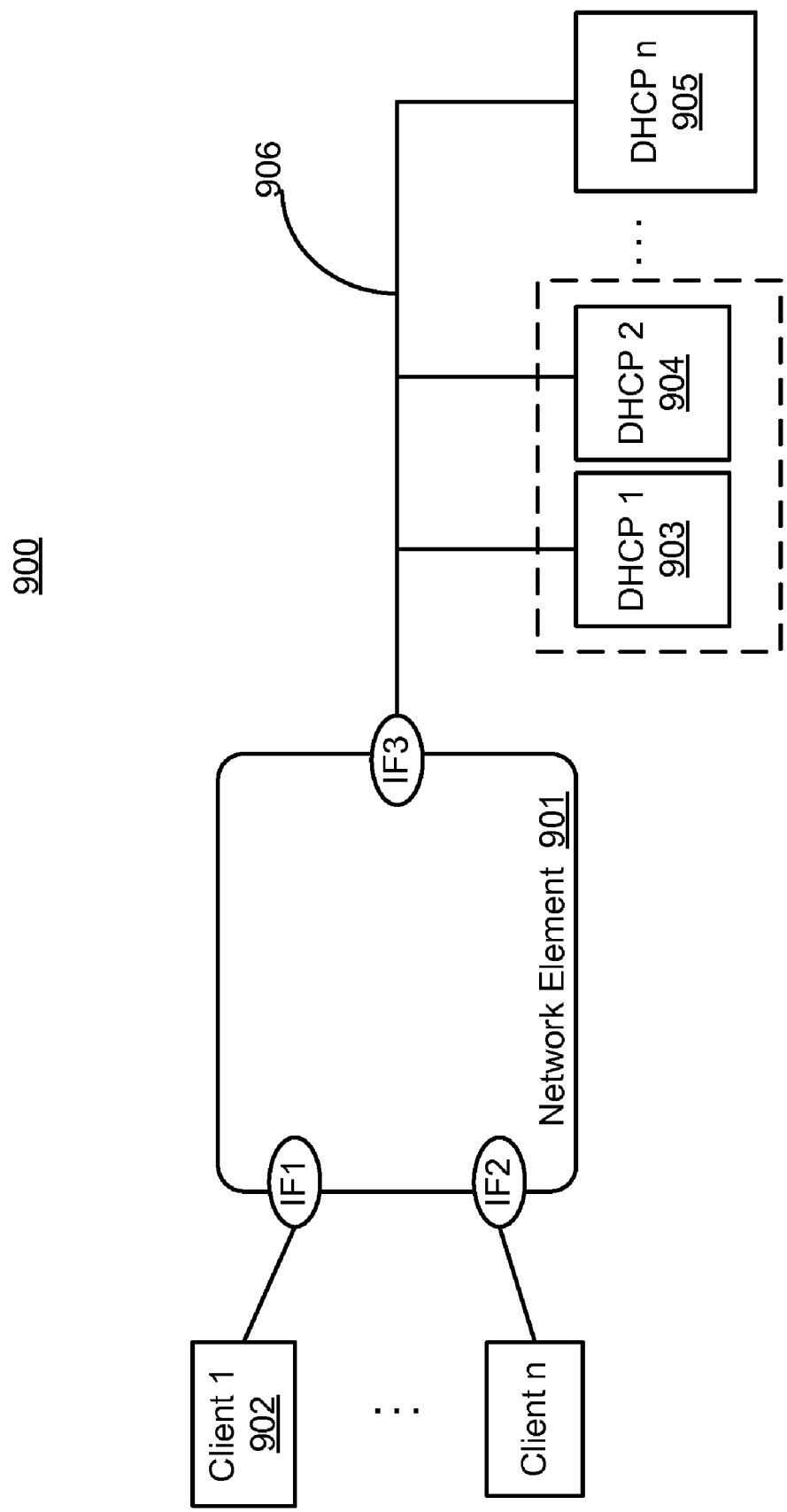
FIG. 9 is a block diagram illustrating an exemplary network configuration having redundant DHCP servers according to one embodiment of the invention.

As described above, when a network element's DHCP proxy functionality is activated, all clients connected to the network element would consider the network element as a DHCP server. As a result, multiple DHCP servers may be implemented behind the network element without the knowledge of the clients. FIG. 9 is a block diagram illustrating an exemplary network configuration according to one embodiment of the invention. Referring to FIG. 9, in one embodiment, network element 901 includes, but not limited to, an interface IF1 serving as a DHCP proxy on behalf of multiple DHCP servers 903-905. However, client 902 only considers network element 901 as the DHCP server. According to one embodiment, DHCP 904 may serve as a redundant DHCP server for DHCP 903. When DHCP 903 is not operating, DHCP 904 may take over on behalf of DHCP 903.

In one embodiment, network element maintains information regarding which interface or client is serviced by which DHCP server. In addition, multiple DHCP servers may share the same IP address pool, such that when the primary DHCP is down, the secondary DHCP may take over using the same IP address pool without causing conflicts. For example, DHCP 903 and DHCP 904 may be configured as a redundant DHCP server pair and they may share the same IP address pool. When DHCP 903 is down, DHCP 904 may take over immediately since DHCP 904 knows the IP address allocation performed by DHCP 903.

Furthermore, according to one embodiment, network element 901 may monitor the activities of all DHCP servers on a per client basis for renewal or release. In a particular embodiment, network element 901 may maintain DHCP servers on a per interface basis, such as, per GI address basis.

According to one embodiment, a network element having DHCP redundant functionality described above may be configured via at least one of the following commands:

| | |
|---|---|
| Command | [no] dhcp relay server ip-addr [giaddr ip-addr] |
| Command Mode | Context configuration |
| Default Behavior | no dhcp relay server is configured, but if a DHCP server is configured, then by default the primary IP-address of the interface is used as the giaddr |

This command enables DHCP relay and proxy functionality in this context. All DHCP requests received on interfaces in this context will be forwarded to an external DHCP server with IP-address x.x.x.x. This command may be used multiple times to configure up to a predetermined number (e.g., five) of DHCP servers per context. The giaddr option is used to specify what IP-address to use in the DHCP packets' giaddr field.

| | |
|---|---|
| Command | [no] dhcp timeout timeout |
| Command Mode | Context configuration |
| Default Behavior | Timeout interval is 10 seconds |

This command sets the maximum time the network element is to wait for a response from a DHCP server before assuming that a packet is lost, or that the DHCP server is unreachable.

| | |
|---|---|
| Command | [no] dhcp algorithm {first | round-robin} |
| Command Mode | Context configuration |
| Default Behavior | The network element queries the first configured server first |

This command configures the algorithm to be used among multiple DHCP servers.

| | |
|---|---|
| Command | [no] dhcp deadtime interval |
| Command Mode | Context configuration |
| Default Behavior | The network element considers a non-response DHCP server for dead in 5 minutes |

This command configures the time the network element will consider a non-responsive DHCP server as dead, and will not revert to and try the DHCP server again until the timeout has expired (unless all other DHCP servers are also non-responsive).

Since the DHCP server implementation often is centralized in a network element as well as Wi-Fi networks, it can be a considerable traffic overhead as well as place a big burden on the DHCP servers if DHCP lease timers are configured in the minutes for a large amount of subscribers. For example, referring to FIG. 2, clients 203 communicate with DHCP servers 202 directly via a DHCP relay interface of network element 201 for renewal and release of IP addresses. If clients 203 include thousands of clients and each of those clients has an IP address having a relatively short time leased from DHCP 202, the overhead traffic incurred on DHCP 202 would be significantly large. In addition, since network element 201 is not involved in a relay mode, network element 201 has no knowledge whether an IP address has been released since the respective client directly releases the IP address back to DHCP 202 without involving network element 201. As a result, network element 201 keeps listening the traffic associated with that IP address even though it may be already released. Furthermore, when another client requests for an IP address, that released IP address cannot be assigned by network element 201 because network element 201 may still think that IP address has not released yet.

However, if network element 201 maintains the lease time of IP addresses for its clients, the renewal and release of the IP addresses may be handled by network element 201 without substantially invoking DHCP 202. For example, according to one embodiment, when client 204 initially requests for an IP address, thinking that network element 201 is the DHCP server, network element 201 requests an IP address from DHCP 202 on behalf of client 204 with relatively large block of lease time, which may be larger than the one requested by client 204. When network element 201 forwards the allocated IP address to client 204, network element 201 allocates the requested lease time from the relatively large block of lease time allocated from DHCP 202 and assigned to client 204.

Subsequently, according to one embodiment, when client 204 requests a renewal of the IP address, network element 201 checks the remaining relatively large block of lease time corresponding to the IP address of client 204 to determine whether the remaining lease time of the block is greater than or equal to the requested lease time for renewal, if so, network element 201 allocates again from the larger block of lease time maintained by the network element to the client without involving DHCP 202. These renewal processes do not involve DHCP 202 until some threshold amount of lease time remains in the block of lease time (e.g., there is not enough lease time remaining in the block of lease time), in which case, network element 201 may request for another relatively large block of time from DHCP 202. As a result, the overhead traffic incurred on DHCP 202 has been greatly reduced.

In addition, when client 204 releases the IP address, network element 201 knows when the IP address has been released and it may in turn release the IP address back to DHCP 202 and stop listening to the traffic associated with the released IP address.

Figure 10:
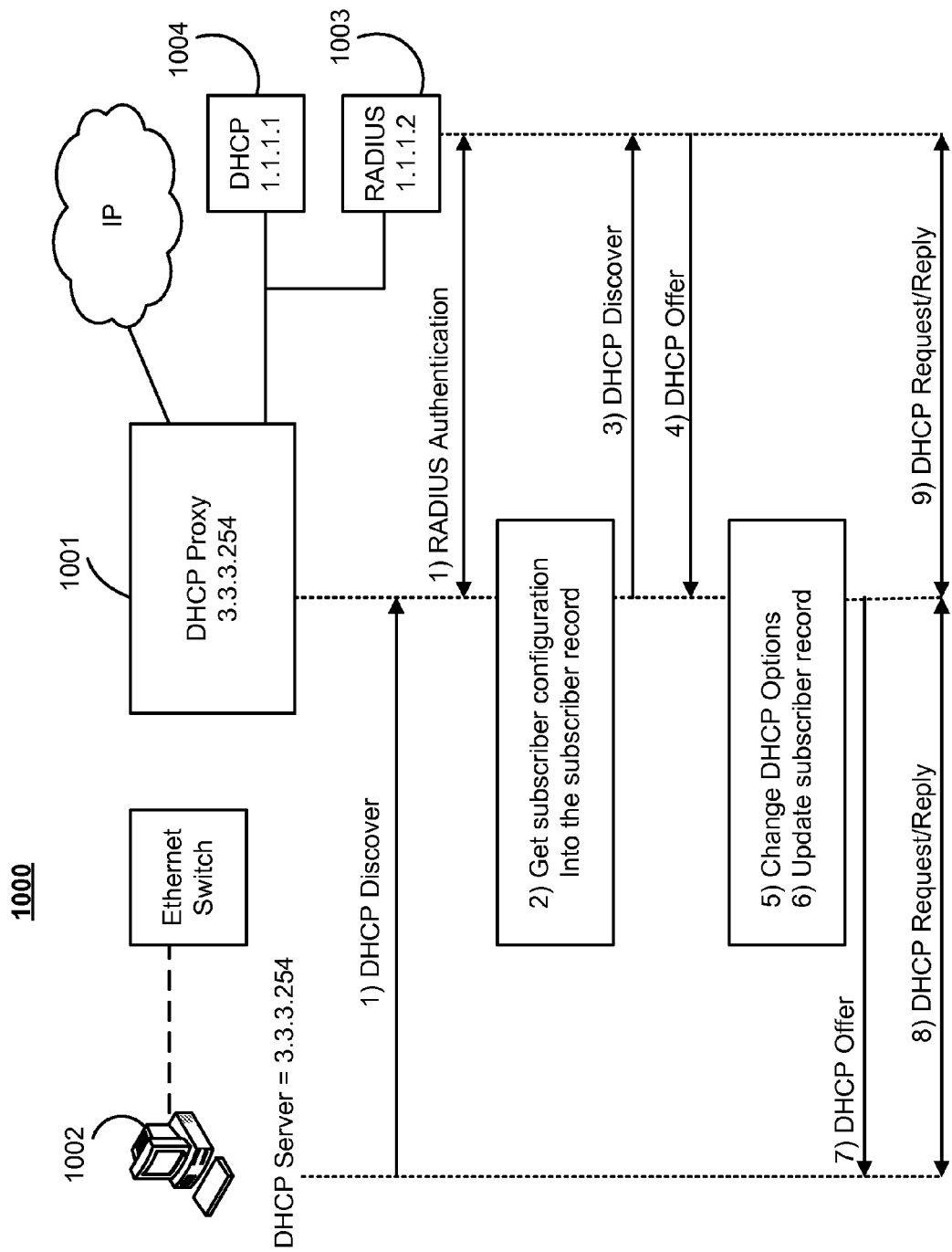
FIG. 10 is a flow diagram illustrating an exemplary process for DHCP discovery according to one embodiment of the invention.

FIG. 10 is a flow diagram illustrating an exemplary process for DHCP discovery according to one embodiment of the invention. Referring to FIG. 10, according to one embodiment, when network element 1001 receives a DHCP discovery request from client or subscriber 1002, network element 1001 authenticates client 1002 for a valid connection via RADIUS 1003. The subscriber record with subscriber specific options and parameters, including, for example, the "idle timer" is read either from RADIUS 1003 or from a local subscriber database. In a CLIPS case, according to one embodiment, the MAC address of the subscriber may be used as the subscriber's ID. In a "bind subscriber" case, the subscriber name is known from the binding processes. When subscriber 102 is authenticated, the DHCP discovery packet is forwarded to DHCP server 1004 in the context where the subscriber is terminated. In response, a DHCP offer is received at network element 1001 from DHCP 1004, including, but not limited to, DHCP options, such as the lease time. In one embodiment, the lease time in the DHCP offer received from DHCP 1004 is relatively larger than the subscriber idle-timer received in the subscriber configuration from RADIUS or local configuration for client 1002. In this embodiment, the idle-timer received during the authentication of the client is used as the lease time for the client.

According to one embodiment, network element 1001 changes the DHCP options, such as the lease time to reflect the subscriber 1002 specification configuration (e.g., lowest value of the subscriber idle timer and the DHCP server applied lease time. Network element 1001 may also store the DHCP server 1004's lease time in the subscriber record maintained by the network element for future use. Thereafter the DHCP offer packet is forwarded to subscriber 1002. Subsequently, when subscriber 1002 sends a DHCP request to network element 1001, thinking that the network element is the DHCP server, network element 1001 forwards the DHCP request packet to DHCP 1004 and receives a DHCP reply packet from the DHCP 1004. Network element 1001 modifies the DHCP options again to reflect the same values as in the offer packet, before sending it to subscriber 1002.

According to one embodiment, network element 1001 maintains two "lease times" for subscriber 1002. One is the lease time received from DHCP 1004, which is needed for the network element to know when a DHCP renewal requires to be forwarded to DHCP 1004. The other one is the actual lease time of subscriber 1002, which indicates when it is safe for the network element to give a local response to the subscriber renewal request without invoking the DHCP server. In one embodiment, if the lease time received from DHCP 1004 is greater than an idle timer received during the authentication of the subscriber 1002, the actual lease time of the subscriber 1002 may be set as the same as the idle timer. However, when the lease time received from the DHCP 1004 is less than the idle timer of the subscriber, the actual lease time of the subscriber may be set using the lease time received from the DHCP 1004. Other operations may be included.

Figure 11:
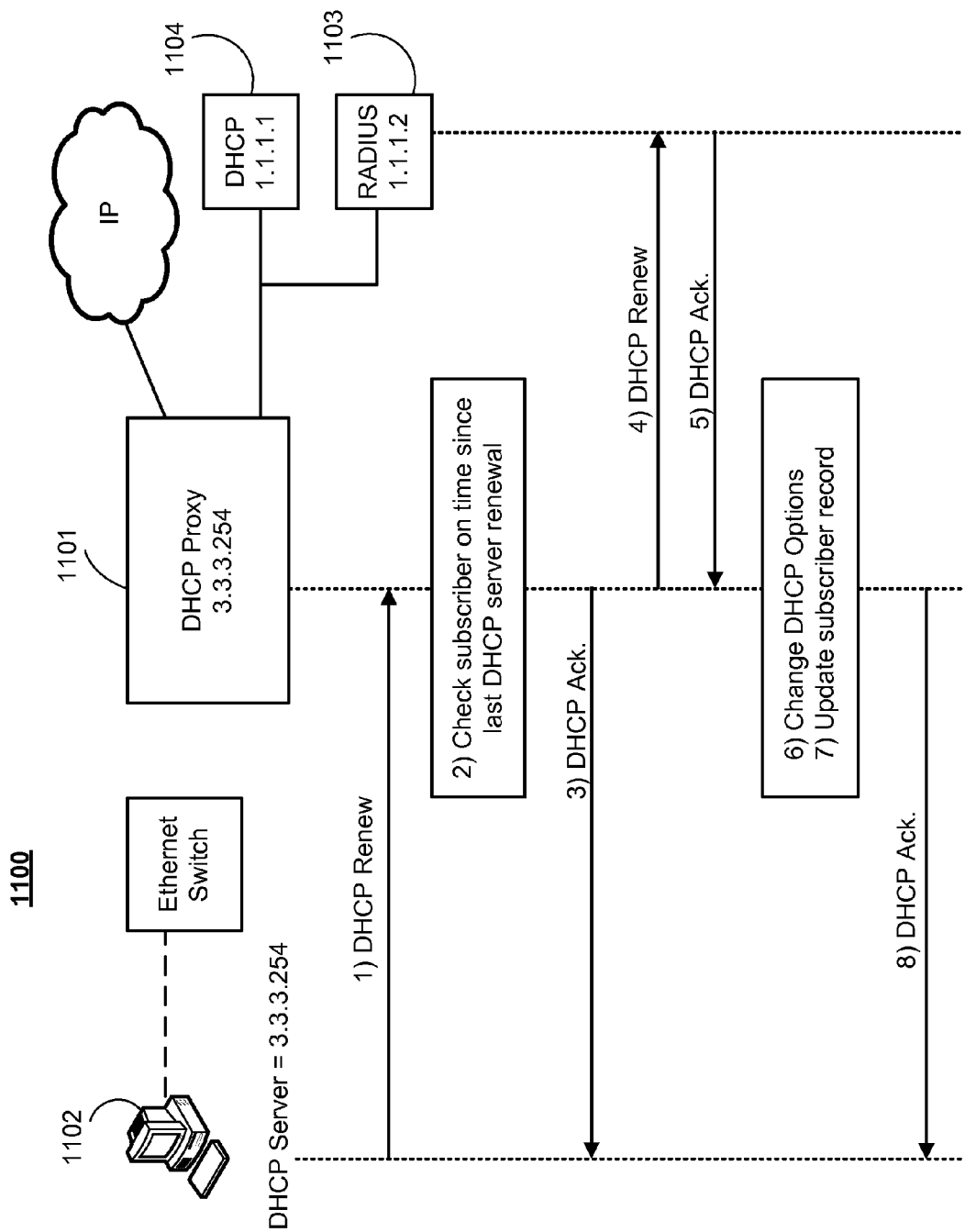
FIG. 11 is a flow diagram illustrating an exemplary process for DHCP renewal according to one embodiment of the invention.

FIG. 11 is a flow diagram illustrating an exemplary DHCP renewal process according to one embodiment of the invention. Referring to FIG. 11, according to one embodiment, when network element 1101 receives a DHCP lease renewal request from subscriber 1102, network element 1101 checks the subscriber session time since the last DHCP lease time value was received from the DHCP server. Network element 1101 may use the T1 timer from DHCP 1104 to determine how to react to the subscriber's renewal request.

In one embodiment, if the subscriber session time is less than DHCP T1 timer (e.g., there is more time left in the lease time allocated from DHCP 1104, where T1=x*duration of lease time), the network element may immediately send a DHCP reply packet to acknowledge the lease renewal for the subscriber without invoking DHCP 1104.

If the subscriber session time is greater or equal to the DHCP T1 timer (e.g., no enough lease time left in the lease time previously allocated from DHCP 1104), network element 1101 may forward the DHCP lease renewal packet to DHCP 1104 for more lease time. In response, network element 1101 receives a DHCP reply from DHCP 1104 including, but not limited to, DHCP options such as the lease time, which may include a longer lease time longer than the one requested by client 1102. When network element 1101 forwards the packet client 1102, the DHCP lease time is changed to reflect the subscriber specific configuration (e.g., the lowest value of the subscriber idle timer and the DHCP server applied lease time). Meanwhile, network element 1101 may also update the subscriber record regarding the lease time from DHCP 1104 for future use. Thereafter, network element 1101 forwards the DHCP acknowledge packet back to subscriber 1102. Other operations may be included.

A network element modifying the DHCP lease timer has been described herein. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method in a network element to handle Dynamic Host Configuration Protocol (DHCP) lease time on behalf of a DHCP server coupled to the network element, comprising the steps of:

receiving a client request for an IP address for a first amount of lease time;

requesting, on behalf of said client, an IP address from the DHCP server for an amount of lease time greater than said first amount of lease time;

receiving, from the DHCP server, a message indicating an allocated IP address for the amount of time requested by the network element which is greater than the first amount of lease time;

transmitting a reply to the client with the allocated IP address for the first amount of lease time;

receiving a renewal request from the client for said allocated IP address for a second amount of lease time;

determining that the time remaining on the amount of lease time allocated by the DHCP server for the allocated IP address is greater than the second amount of lease time; and, transmitting a reply to the client acknowledging the renewal of the IP address for the second amount of lease time without involving the DHCP server, whereby traffic overhead on the DHCP server is reduced due to DHCP renewal service being provided without a renewal request being transmitted to the DHCP server.

2. The method of claim 1, further comprising the steps of:

receiving a renewal request from the client for the allocated IP address for a third amount of lease time;

determining that the time remaining on the amount of lease time allocated by the DHCP server for the allocated IP address is less than the third amount of lease time;

requesting from the DHCP server, on behalf of the client, a renewal of the allocated IP address for at least the third amount of lease time;

receiving, from the DHCP server, a message acknowledging the renewal of the allocated IP address for the amount of lease time requested by the network element for the allocated IP address; and, transmitting a reply to the client acknowledging the renewal of the allocated IP address for the third amount of lease time, whereby the DHCP renewal process does not involve the DHCP server until there is not enough lease time remaining in the amount of time allocated by the DHCP server to satisfy the renewal request.

3. The method of claim 2, further comprising the steps of:

receiving a request from the client for a release of the allocated IP address;

transmitting a release request to the DHCP server for a release of the allocated IP address; and, stopping the listening of traffic associated with the released IP address, whereby resources of the network element are conserved.

4. The method of claim 3, wherein the step of requesting an IP address from the DHCP server on behalf of the client further comprises the step of modifying the client request for an IP address to specify a source identity of the network element.

5. The method of claim 3, wherein the step of transmitting the reply to the client with the allocated IP address for the first amount of lease time comprises modifying the reply message such that it appears that the network element is the DHCP server.

6. The method of claim 5, wherein the step of transmitting the reply to the client with the allocated IP address for the first amount of lease time comprises changing the lease time of the of the message received from the DHCP server to the first amount of lease time requested by the client.

7. A network element for handling Dynamic Host Configuration Protocol (DHCP) lease time on behalf of a DCHP server, the network element comprising:

a processor; and a memory coupled to the processor to store instructions, which when executed by the processor, cause the processor to perform the following:

receive a client request for an IP address for a first amount of lease time;

request, on behalf of said client, an IP address from the DHCP server for an amount of lease time greater than said first amount of lease time;

receive, from the DHCP server, a message indicating an allocated IP address for the amount of time requested by the network element which is greater than the first amount of lease time;

transmit a reply to the client with the allocated IP address for the first amount of lease time;

receive a renewal request from the client for said allocated IP address for a second amount of lease time;

determine that the time remaining on the amount of lease time allocated by the DHCP server for the allocated IP address is greater than the second amount of lease time; and transmit a reply to the client acknowledging the renewal of the IP address for the second amount of lease time without involving the DHCP server, whereby traffic overhead on the DHCP server is reduced due to DHCP renewal service being provided without a renewal request being transmitted to the DHCP server.

8. The network element of claim 7, further comprising:

the memory to store further instructions, which when executed by the processor, cause the processor to perform the following:

receive a renewal request from the client for the allocated IP address for a third amount of lease time;

determine that the time remaining on the amount of lease time allocated by the DHCP server for the allocated IP address is less than the third amount of lease time;

request from the DHCP server, on behalf of the client, a renewal of the allocated IP address for at least the third amount of lease time;

receive, from the DHCP server, a message acknowledging the renewal of the allocated IP address for the amount of lease time requested by the network element for the allocated IP address; and, transmit a reply to the client acknowledging the renewal of the allocated IP address for the third amount of lease time, whereby the DHCP renewal process does not involve the DHCP server until there is not enough lease time remaining in the amount of time allocated by the DHCP server to satisfy the renewal request.

9. The network element of claim 8, further comprising:

the memory to store further instructions, which when executed by the processor, cause the processor to perform the following:

receive a request from the client for a release of the allocated IP address;

transmit a release request to the DHCP server for a release of the allocated IP address; and stop listening to traffic associated with the released IP address, whereby resources of the network element are conserved.

10. The network element of claim 9, wherein the instructions, which when executed by the processor, also cause the processor to modify the client request for an IP address to specify a source identity of the network element.

11. The network element of claim 9, wherein the instructions, which when executed by the processor, also cause the processor to modify the reply to the client such that it appears that the network element is the DHCP server.

12. The network element of claim 11, wherein the instructions, which when executed by the processor, also cause the processor to change the lease time included in the message that is to be received from the DHCP server indicating the allocated IP address to the first amount of lease time that is to be requested by the client.

13. A system for providing Dynamic Host Configuration Protocol (DHCP) services, the system comprising:
   a plurality of clients;
   a DHCP server that allocates IP addresses with blocks of lease time;
   a network element coupled to the plurality of clients and the DHCP server, wherein the network element handles renewal of IP addresses allocated to the clients without substantially invoking the DHCP server, wherein the network element locally responds to each IP address renewal request from the clients as if it is the DHCP server until a threshold amount of lease time remains in the block of lease time allocated by the DHCP server for the IP address corresponding with that IP address renewal request and modifies replies to the clients to change the amount of time allocated by the DHCP server for the IP addresses, whereby traffic overhead on the DHCP server is reduced due to the network element locally responding to those IP address renewal requests thereby avoiding transmission of those IP address renewal requests to the DHCP server.

14. The system of claim 13, wherein the network element further performs the following:
   handles releases of IP addresses allocated to the plurality of clients as if it is the DHCP server; and
   stops listening to the traffic associated with released IP addresses, whereby resources of the network element are conserved.

15. The system of claim 14, wherein the network element further performs the following:
   modifies IP address requests to specify a source identity of the requests with an identity of the network element.

16. The system of claim 14, wherein the network element further performs the following:
   modifies replies to the clients to specify a source identify of the replies as if the network element is the DHCP server.

17. The system of claim 16, wherein the network element further requests renewal of IP addresses from the DHCP server for each IP address renewal request whose lease time for its corresponding IP address has reached the threshold amount of lease time in the block of lease time allocated by the DHCP server for that IP address.

18. The system of claim 17, wherein the network element further modifies IP address renewal requests with an identity of the network element.

19. The system of claim 18, wherein the DHCP server further responds to IP address renewal requests with blocks of lease time.

* * * * *

UNITED STATES PATENT AND TRADEMARK OFFICE
CERTIFICATE OF CORRECTION

| | | |
|---|---|---|
| PATENT NO. | : 8,125,993 B2 | Page 1 of 1 |
| APPLICATION NO. | : 12/542653 | |
| DATED | : February 28, 2012 | |
| INVENTOR(S) | : Arberg et al. | |

It is certified that error appears in the above-identified patent and that said Letters Patent is hereby corrected as shown below:

On the title page, item (75), under "Inventors", in Column 1, Line 1, delete "Hojbjerg" and insert -- Højbjerg --, therefor.

In Column 8, Line 67, delete "record;" and insert -- record: --, therefor.

In Column 13, Lines 58-59, in Claim 6, delete "of the of the" and insert -- of the --, therefor.

Signed and Sealed this
Fourteenth Day of August, 2012

David J. Kappos
*Director of the United States Patent and Trademark Office*